(12) United States Patent
Oh et al.

(10) Patent No.: US 11,169,523 B2
(45) Date of Patent: Nov. 9, 2021

(54) CONTROL APPARATUS AND METHOD FOR SWIMMING OF ROBOT FISH

(71) Applicant: Artificial Intelligence Robot Inc., Suncheon-si (KR)

(72) Inventors: Yong Joo Oh, Suncheon-si (KR); Ji Gyeong Yu, Suncheon-si (KR); Kyong Chol Chong, Suncheon-si (KR); Ji Hoon Kim, Suncheon-si (KR)

(73) Assignee: Artificial Intelligence Robot Inc., Suncheon-si (KR)

( * ) Notice: Subject to any disclaimer, the term of this patent is extended or adjusted under 35 U.S.C. 154(b) by 371 days.

(21) Appl. No.: 16/191,118

(22) Filed: Nov. 14, 2018

(65) Prior Publication Data

US 2020/0142415 A1 May 7, 2020

(30) Foreign Application Priority Data

Nov. 1, 2018 (KR) .................. 10-2018-0132693
Nov. 1, 2018 (KR) .................. 10-2018-0132694
Nov. 1, 2018 (KR) .................. 10-2018-0132695

(51) Int. Cl.
*G05D 1/02* (2020.01)
*B63H 1/36* (2006.01)
*G01C 5/06* (2006.01)
*G01V 11/00* (2006.01)
*G01C 9/02* (2006.01)

(52) U.S. Cl.
CPC ............ *G05D 1/0206* (2013.01); *B63H 1/36* (2013.01); *G01C 5/06* (2013.01); *G01C 9/02* (2013.01); *G01V 11/00* (2013.01); *B63B 2207/02* (2013.01)

(58) Field of Classification Search
None
See application file for complete search history.

(56) References Cited

U.S. PATENT DOCUMENTS

2012/0298030 A1\* 11/2012 Lee .................. H02J 50/90
114/337

FOREIGN PATENT DOCUMENTS

| JP | 2008-044545 A | 2/2008 |
| KR | 10-2012-0096740 A | 8/2012 |
| KR | 10-2015-0028549 A | 3/2015 |

OTHER PUBLICATIONS

Zhang "Gliding Robotic Fish: An Underwater Sensing Platform and Its Spiral-Based Tracking in 3D Space", Marine Technology Society Journal Sep. 2017 (Year: 2017).*
Inzartsev "Autonomous Underwater Vehicle Motion Control during Investigation of Bottom Objects and Hard-to-Reach Areas", IntechOpen, Jan. 1, 2010 (Year: 2010).*

(Continued)

*Primary Examiner* — Nicholas K Wiltey
(74) *Attorney, Agent, or Firm* — Novick, Kim & Lee, PLLC; Sang Ho Lee; Hyun Woo Shin (57) ABSTRACT

Provided are an apparatus and a method of controlling swimming for a robotic fish. The robotic fish, which is operated in a narrow space like an aquarium, often hits the outer wall during submerging or upwardly swimming. In order to solve this problem, the present invention provides an inclination adjusting means, which adjusts the inclination while generating the rotational propulsive force, it is possible to do smooth submergence and upwardly swimming in the narrow space.

7 Claims, 7 Drawing Sheets

(56) References Cited

OTHER PUBLICATIONS

Marchese, Autonomous Soft Robotic Fish Capable of Escape Maneuvers Using Fluidic Elastomer Actuators, Soft Robotics, vol. 1, No. 1, 2014 (Year: 2014).*

Description and Drawings translated from IP.com of KR101544360 (Year: 2013).*

\* cited by examiner

CONTROL APPARATUS AND METHOD FOR SWIMMING OF ROBOT FISH

CROSS-REFERENCE TO RELATED APPLICATIONS

The instant application claims priority to Korean patent application No. 10-2018-0132693, No. 10-2018-0132694 and No. 10-2018-0132695 filed on Nov. 1, 2018, the entire contents of which are hereby incorporated by reference.

TECHNICAL FIELD

The present invention relates to a robotic fish, and more particularly to an apparatus and a method of controlling swimming for a robotic fish.

BACKGROUND ART

Raising an ornamental fish in an aquarium is required careful management such as aquatic plants, watering, feeding, etc. and may be costly to maintain in many ways. Some kinds of ornamental fishes may be very expensive, and it may be very difficult to purchase or obtain rare or extinct fish species that are prohibited from trading.

In recent years, the robotic fish that can imitate the movement of real fish are displayed in the aquarium together with the real fish, or in the aquarium with only the robotic fish. For example, replacing predatory species with robotic fish eliminates the need to constantly supply foods, the extinct fish species can be reproduced as a robotic fish to exhibit for educational purposes.

The fins and trunk of current robotic fish are being developed to move like the real fish.

For submerging or upwardly swimming of the robotic fish, the robotic fish can submerge and upwardly swim, as adjusting the inclination of the robotic fish and generating the propulsive force. However, since the fish adjusts the inclination by adjusting the buoyancy or the weight, it was difficult to adjust the inclination of the fish suddenly, so the fishes may submerge or upwardly swim at the smooth inclination.

Therefore, when the robotic fish starts submerging or upwardly swimming in the aquarium that is not big enough, the robotic fish may hit to the outer wall of the aquarium before it reaches the desired depth, and breakage or failure of the robotic fish or aquarium may occur in some cases.

In addition, if the robotic fish is set to be floated in the autonomous swimming manner, the robotic fish swims to avoid obstacles. If it is set that as swimming at a predetermined depth in the initial stage or swimming with the autonomous swimming pattern to submerge and upwardly swim. However, when the robotic fish may hit to the wall of the aquarium or swims with the obstacle avoiding operation, there is a problem that the robotic fish swims only on the water surface or the bottom surface after a certain period of time.

Such the robotic fish may swim with the obstacle avoiding operation when it is operated by the autonomous swimming manner, but there may be a problem that the robotic fish is caught by a corner or other obstacle in the aquarium. Since the obstacle avoidance operation of the robotic fish is performed through the rotational swimming, the robotic fish is caught between the corners and at least two obstacles where there are no spaces for not allowing rotational function. Instead, since the robotic fish only generate momentum in one place, as not swimming any more, it may cause breakage or breakdown of the product, and immobility that the robotic fish is no longer active.

When the robotic fish is caught between the obstacles, it is required to backward propulsive force to escape from the obstacles. However, the robotic fish, that generates forward propulsive force by shaking the joints of a fish body in left and right directions, could not generate the backward propulsive force. Therefore, it is necessary to install a backward propulsive device such as a screw to separately generate the backward propulsive force, this results in a problem that the structure of the robotic fish device becomes more complicated and becomes larger in size, and there is also a problem in sealing of the robotic fish device.

DISCLOSURE

Technical Problem

Accordingly, the present invention has been made keeping in mind the above problems occurring in the prior art, and it is an object of the present invention to provide an apparatus and a method of controlling swimming for a robotic fish which can freely submerge or upwardly swim in narrow space by spiral rotational swimming during submerging or upwardly swimming operation of the robotic fish.

In addition, the present invention provides an apparatus and a method of controlling swimming for a robotic fish which can achieve the autonomous swimming including submergence and upwardly swimming at a certain depth of water using the maximum submergence depth and rising time while it is set the maximum depth for allowing the submergence and the rising time for upwardly rising at the maximum depth.

In addition, the present invention provides an apparatus and a method of controlling swimming for a robotic fish, which can escape from the obstacle using the variable buoyancy by controlling the inclination of the robotic fish at predetermined time intervals without separately installing a backward propulsive device in the robotic fish that generates the propulsive force by moving the joint portion to the left and right directions.

Technical Solution

According to an aspect of the present invention, there is provided a robotic fish swimming control apparatus comprising: a fish shaped body portion is divided into a plurality of pieces by connecting to each joint portion to be rotatable in the left and right directions; a controlling device for generating a straight or rotational propulsive force by controlling the joint portion, and swimming to avoid obstacles detected by an obstacle detection sensor; an inclination adjusting means for adjusting an inclination of the robotic fish in the forward and backward directions; and an inclination sensor for detecting the inclination of the robotic fish in the forward and backward directions; wherein the controlling device controls the robotic fish to be submerged or raised by a helical rotational swimming by adjusting the inclination a forward submergence or rising direction by controlling the inclination adjusting means and generating a rotational propulsive force by controlling the joint portion, as submerging or upwardly swimming control of the robotic fish.

The robotic fish body further includes a bottom distance sensor for measuring a distance from the bottom surface, wherein the controlling device detects the distance from the bottom surface by the bottom distance sensor as controlling the submerging or upwardly swimming, and releases the rotational swimming by adjusting the inclination adjusting means to the equilibrium state and controlling the joint portion when the robotic fish is reached to the distance to the predetermined bottom surface.

Further, a rearmost joint portion on the tail fin side among the plurality of joints generate the propulsive force in the left and right rotational swimming, the other joint portions in front of the rearmost joint portions is controlled to achieve the rotational swimming by fixing at angles rotated in either one direction.

When the obstacle is sensed in the rotational direction by the obstacle detection sensor in the rotational swimming state, it is controlled the rotational swimming in the opposite direction by controlling the joint portion.

In addition, when the obstacle is repeatedly detected within a predetermined time by both the left and right sides of the obstacle detection sensor during the rotational swimming, the rotational swimming is released by controlling the joint portion, and after intermittently repeating the generation and stop of the propulsive force in several times at predetermined time intervals, and restart the rotational swimming again.

Further, in the course of repeating the generation and stop of the propulsive force, the inclination adjusting means alternately controls the rising inclination or the submergence inclination.

Further, the submergence and rising swimming are repeated within the distance from the preset bottom surface depending on the distance from the bottom surface measured through the bottom distance sensor.

In addition, the maximum submergence time during the submergence swimming is determined to set the submersible maximum depth to a certain depth, set the rise time to set the activity range from the submersible maximum depth to a certain height, and detected the bottom surface by the bottom distance sensor on the bottom surface during submerging, and then changed to the rising swimming as sensing the bottom surface.

The apparatus of controlling swimming for the robotic fish according to the present invention comprises a buoyancy regulator as the inclination adjusting means, and the buoyancy regulator includes a pneumatic cylinder installed on the front and rear sides based on the center of gravity of the robotic fish, and an inclination detection sensor is installed to detect the inclination state of the robotic fish.

A hole is formed upward in the upper end of the pneumatic cylinder so that external water can be sucked and discharged, the buoyancy is controlled by the contrast between the amount of water suction on the upper side of the piston and the amount of air on the lower side of the piston, and the inclination is adjusted by the buoyancy difference of the left and right pneumatic cylinders.

As another embodiment of the method of installing the buoyancy regulator, one pneumatic cylinder is installed longitudinally in the body of the robotic fish by sucking or discharging water by operation of the pneumatic cylinder, and the buoyancy and inclination can be controlled by the amount of water sucked into the cylinder.

The robotic fish further includes a water pressure sensor, the control unit measures the depth of the robotic fish based on the water pressure sensed by the water pressure sensor, and controls so that the buoyancy regulator is automatically controlled so as to maintain the desired water depth.

Advantageous Effects

According to the present invention, the apparatus and the method of controlling swimming for the robotic fish smoothly enables submergence and upwardly swimming in the small space by controlling the robotic fish to submerge or upwardly swim with the spiral swimming manner after adjusting the inclination and generating the rotational propulsive force during submerging and upwardly swimming, when an inclination adjusting means and an inclination sensor are installed in the robotic fish.

Further, according to the present invention, the apparatus and the method of controlling swimming for the robotic fish allows the robotic fish to escape from the obstacles along the natural water flow by repeatedly varying the inclination in forward and backward directions at predetermined time intervals, if the obstacle sensors on the left and right sides of the robotic fish continuously detect the obstacle state for a predetermined time or longer, and determine that the robotic fish is caught in the obstacle, then it is determined that the robotic fish is caught, thereby stopping the generation of the propulsive force.

Accordingly, the apparatus and the method of controlling swimming for the robotic fish according to the present invention enables to naturally escape from the obstacle caught state without separately installing the backward propulsive device.

Accordingly, it is possible to solve the problem of continuously hitting to the outer wall by generating the propulsive force in meaninglessly swimming operation as being caught in obstacles, or by failing to perform the obstacle avoidance operation.

DETAILED DESCRIPTION

Hereinafter, a preferred embodiment of the present invention will be described in detail with reference to the accompanying drawings.

Before describing the present invention, the following specific structure or functional description is merely illustrative for the purpose of describing an embodiment according to the concept of the present invention, and embodiments according to the concept of the present invention may be embodied in various forms, and should not be construed as limited to the embodiments described herein.

In addition, since the embodiments according to the concept of the present invention can make various changes and have various forms, specific embodiments are illustrated in the drawings and described in detail herein. It should be understood, however, that it is not intended to limit the embodiments according to the concepts of the present invention to the particular forms disclosed, but includes all modifications, equivalents, and alternatives falling within the spirit and scope of the present invention.

Figure 1:
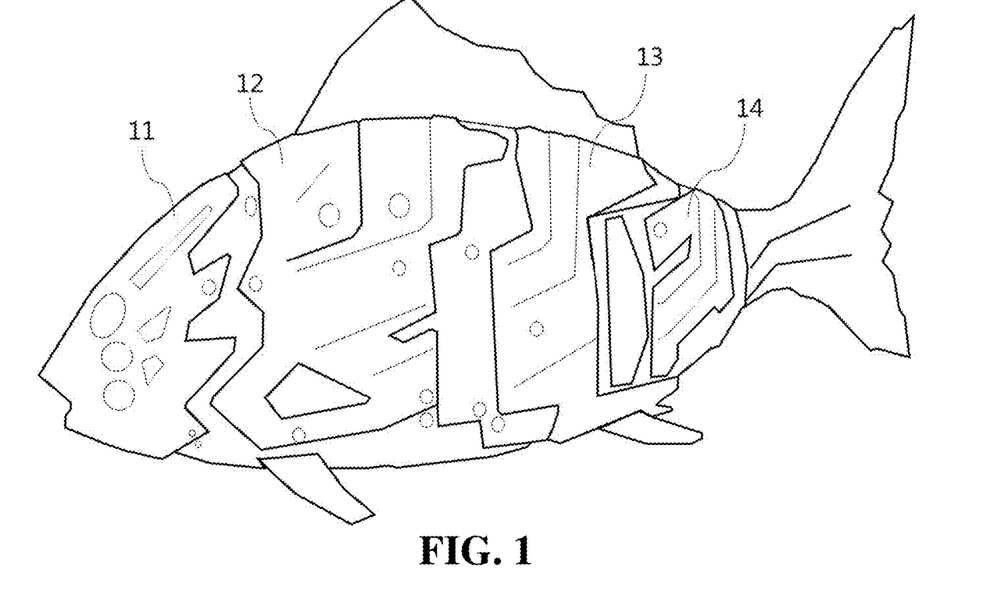
FIG. 1 is an exemplary modeling drawing of a robotic fish according to the present invention.
Figure 2:
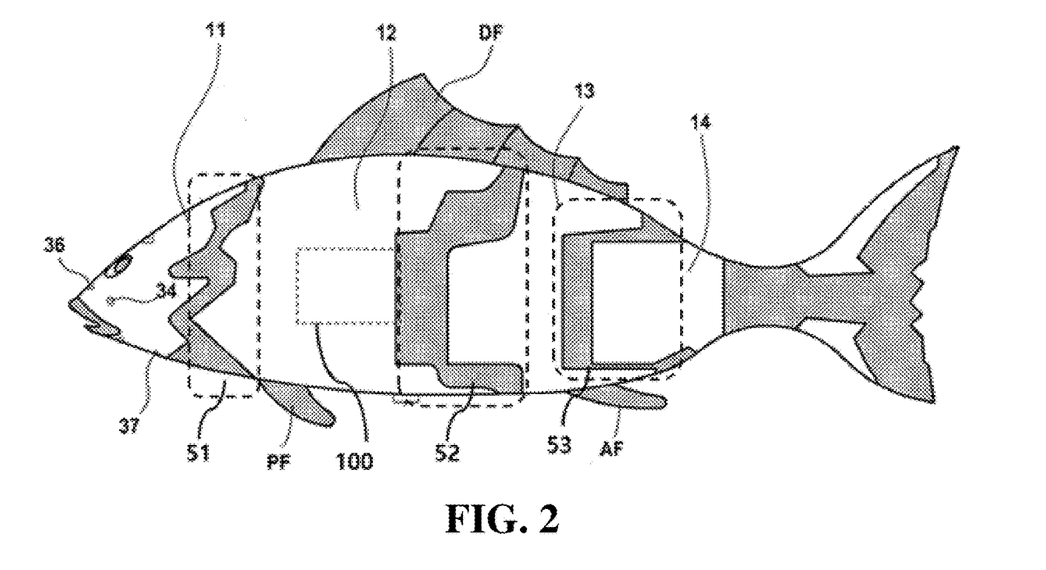
FIG. 2 is an exemplary side view of a robotic fish according to the present invention.

FIG. 1 is an exemplary modeling view of a robotic fish according to the present invention, and FIG. 2 is an exemplary side view of a robotic fish according to the present invention.

As shown in FIGS. 1 and 2, the robotic fish according to the present invention is includes a plurality of portions, and each portion is hinged so as to be capable of turning right and left by a micro servomotor. Here, the robotic fish has a battery as a self-powered source, drives a driving device by using the power source of the battery to swim in the water. In addition, a left, a right, and a front obstacle detection sensor are installed in a fish head portion of the robotic fish to enable the obstacle avoidance swimming motion. And this configuration is well known in the art, so that the configuration and the explanation thereof will be omitted in a preferred embodiment of the present invention.

A body part of the robotic fish according to the present invention basically divides a fish head portion 11, a central body portion 12, a fish end portion 13, and a tail portion 14. And three joint portions 51-53 hinge coupled to each other by a servomotor may further be included.

The fish head portion 11, having a mouth of the robotic fish in one side end of the central body portion 12, is hinge coupled at one end to be angularly adjustable while being rotated by the micro servomotor, and the fish end portion 13 is hinge coupled at the other end of the central body portion 12 to be angularly adjustable while being rotated by the micro servomotor. And the tail portion 14 is hinge coupled to be rotatable by the micro servomotor at the end of the fish end portion 13.

Therefore, the robotic fish according to the present invention includes three joint portions 51-53 hinge coupled to each connecting link adjacent to each rotating link rotated by the servomotor, among the fish head portion 11, the central body portion 12, the fish end portion 13, and the tail portion 14, respectively.

The fish head portion 11 includes a left sensor 34, a right sensor, a front sensor 36 and a bottom sensor 37 as an obstacle detection sensor. The three joint portions 51-53 maybe all driven by the servomotor, but the first joint portion may be constituted by only the connection of a pivotal hinge without the servomotor. However, at least one joint portion has to constitute at least one servomotor for performing left or right rotational operation to generate the propulsive force.

A dorsal fin DF is formed on the back portion of the robotic fish from the central body portion 12 to the fish end portion 13, and a pair of pelvic fins PF are formed on both sides of the lower portion of the central body portion 12 in the belly of the robotic fish, and a pair of anal fins AF are formed on both sides of the lower portion of the fish end portion 13 which close to the tail portion 14 of the robotic fish.

Also, as shown in FIG. 2, the body includes a controlling device 100 for generating the propulsive force by controlling the joint portion and controlling swimming by the obstacle avoiding operation using the obstacle detection sensors on the basis of a preset swimming program or the control signal of an external radio manipulator received through a communication unit.

Figure 3:
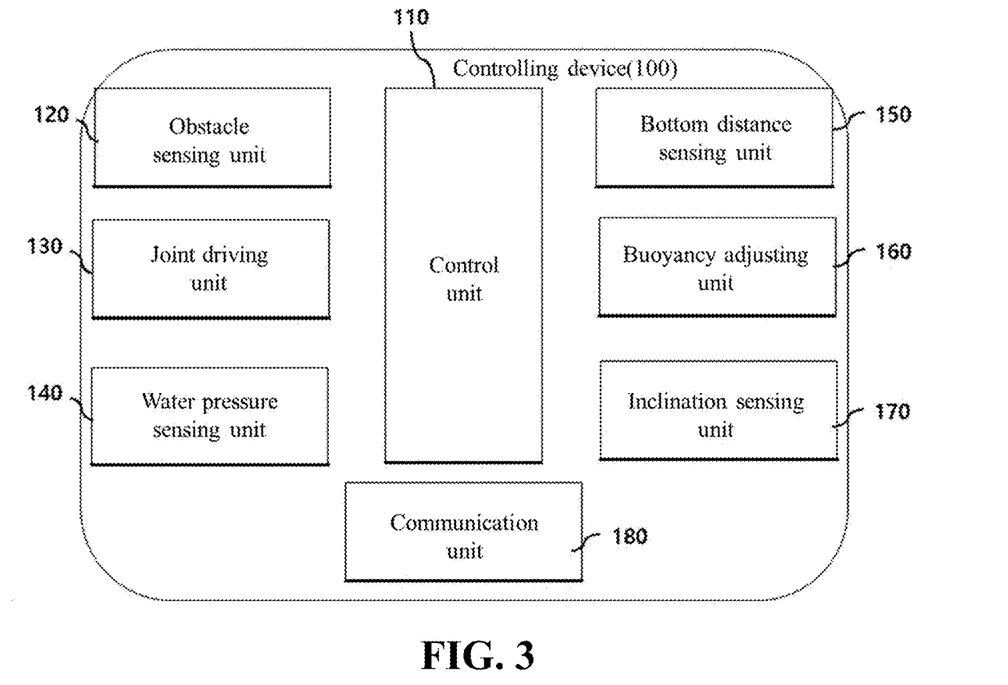
FIG. 3 is a block diagram of a controller for a swimming control apparatus of a robotic fish according to the present invention.

FIG. 3 is a block diagram of a controller for a swimming control apparatus according to a preferred embodiment of the present invention.

The controlling device 100 includes a control unit 110 implemented by a microcomputer, and the control unit 110 includes an obstacle sensing unit 120 for sensing an obstacle sensing signal from obstacle sensing sensors having left, right, front, and bottom sensors, a joint driving unit 130 for controlling the rotational force and propulsive force by driving each servomotors of the joint portion, a water pressure sensing unit 140 for controlling the swimming depth of the robotic fish by measuring the water pressure from the water pressure sensor 141, a bottom distance sensing unit 150 for sensing the distance from a bottom distance sensor 151 to the bottom surface, a buoyancy adjusting unit 160 for controlling the buoyancy and the inclination of the robotic fish by controlling the inclination, an inclination sensing unit 170 for detecting an inclination through an inclination sensor 171 for detecting inclination of the front and the back of the robotic fish, and a communication unit 180 for wirelessly communicating with an external remote controller.

In the robotic fish according to the present invention configured as described above, the control unit 110 of the controlling device 100 generates the propulsive force from the left and right rotational movement by controlling the joint driving unit 130 to drive the servomotors of each joint portions. Each joint portion is designed to be able to rotate left and right at an angle of 90 degrees by left and right 45 degrees based on the center line, and generates the straight propulsive force by the rotational movement of 90 degrees of reciprocating left and right directions. If the robotic fish desires to change the direction in any one direction, it is possible to swim in a manner that makes the reciprocating rotational swim in a predetermined angular range on the opposite side to be rotated among angles of left and right 45 degrees.

At this time, the obstacle sensing unit 120 controls the obstacle avoiding operation to be performed by the autonomous swimming program according to an obstacle detecting signal detected from front, left, right, and bottom sensors.

In addition, when the user manually operates the wireless controller (not shown), the controller 110 may receive the radio control signal through the communication unit 180 and controls the swimming of the robotic fish.

On the other hand, in order to control the submergence or the upwardly swimming, the controller generates the propulsive force to submerge or upwardly swim in a state in which the inclination is inclined toward the front side or the tail side of the robotic fish.

However, the robotic fish may swim in a space where water is filled with in artificial structures such as an aquarium, which is narrow and has a short length, so that the robotic fish often hits an outer wall when diving or swimming. Of course, even if the robotic fish may swim with the obstacle avoidance operation, when the robotic fish submerges or upwardly swims in the narrow space, it may hit the outer wall due to inertia force. Such collisions cause malfunction or damage of the robotic fish, and the robotic fish may quickly become a difficult factor to submerge or upwardly swim to the desired depth.

In order to solve such the problem, the controlling device controls the robotic fish to perform the submergence or upwardly swimming even in the narrow space such as the aquarium by programming to submerge and upwardly swim in the spiral rotational movement when the submergence or upwardly swimming are required.

Therefore, in the apparatus and the method of controlling swimming for the robotic fish according to the present invention, the inclination adjusting means for adjusting the inclination is further provided in the body of the robotic fish, the controlling device 100 for controlling the swimming of the robotic fish controls the joint portion to generate the propulsive force and controls the submergence or upwardly swimming while rotating and swimming motion in the state where the inclination adjusting means is adjusted in the submergence or upwardly swimming direction.

As the inclination adjusting means, a weighting device, capable of adjusting forward and backward movement in the body of the robotic fish, is installed, and an weight member of the weighting device is moved in the forward and backward directions to adjust the inclination of the robotic fish. The configuration for adjusting the inclination by moving the weight member is a well-known configuration, so detailed drawings and detailed explanations will be omitted.

Such the weighting device may control the inclination of the front and back of the robotic fish, the buoyancy itself may balance the initial designed buoyancy by the weight of the weight member, while it may simply adjust the front and back inclination as not controlling the buoyancy during swimming.

Accordingly, the present invention proposes a buoyancy regulator that uses a pneumatic cylinder to control the buoyancy and the inclination.

Figure 4:
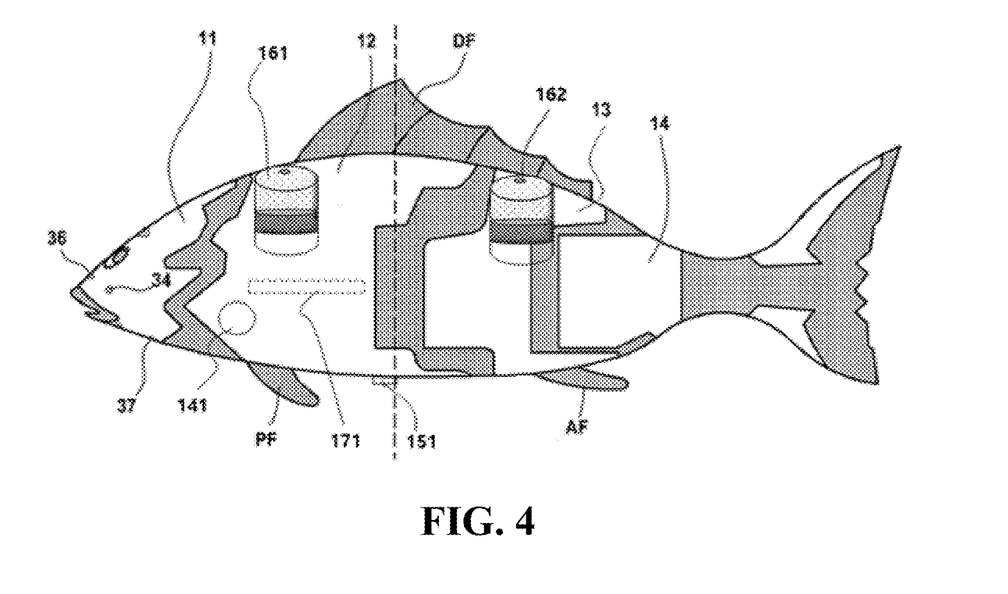
FIG. 4 is a side view for explaining a buoyancy controller of a robotic fish according to the present invention.
Figure 5:
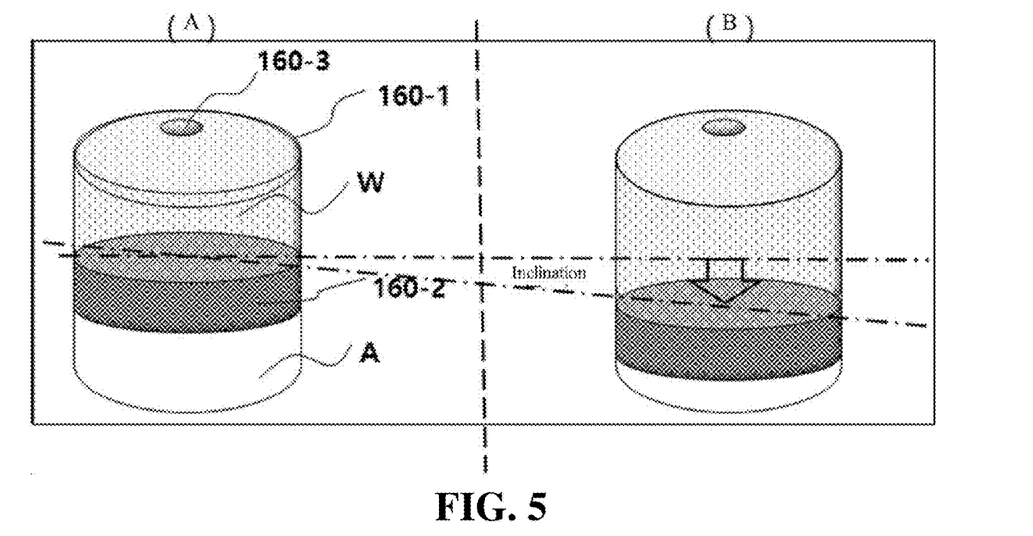
FIG. 5 is a view for explaining the operation of a buoyancy controller of a robotic fish according to the present invention.

FIG. 4 is a side view for explaining a buoyancy regulator of the robotic fish according to the present invention, and FIG. 5 is a view for explaining buoyancy control of the buoyancy regulator of the robotic fish according to the present invention.

As shown in FIGS. 4 and 5, in the present invention, the pneumatic cylinder for sucking and discharging water is installed as the buoyancy regulator to adjust the buoyancy of the robotic fish. As shown in FIG. 4, two pneumatic cylinders 161 and 162 are installed at the front and rear of the center of gravity of the robotic fish, respectively. As shown in FIGS. 5A and 5B, the pneumatic cylinders 161 and 162 are provided with a piston 160-2 inside the cylinder 160-1 and a hole 160-3 is formed in the front end of the cylinder 160-1 to allow reciprocating movement of the piston 160-2.

Normally, the pneumatic cylinder is achieved in a manner that a piston rod of the piston is constituted by a screw rod, and the screw rod is gear coupled to a rotary gear rotated by a motor to move the screw rod forward or backward by the rotation of the motor in the forward and reverse directions. Since the structure of the pneumatic cylinder is applied in normal, the detailed description of the structure will be omitted.

However, the inner side of the piston rod is sealed with the outside, and a hole circulating with the outside is formed in the front end of the upper cylinder of the piston so that external water is sucked or discharged according to the forward and backward movement of the piston. That is, the buoyancy can be adjusted by adjusting the amount of water sucked into the cylinder in the same manner as the principle of the syringe.

The present invention uses the principle of increasing the weight when the suction amount of water is increased in the cylinder as the piston is backwardly moved as shown in FIG. 5B as compared with when the piston is in the middle position of the cylinder as shown in FIG. 5A.

As shown in FIG. 4, the front and rear inclination of the robotic fish can be adjusted by adjusting the positions of the pistons by controlling the two pneumatic cylinders 161 and 162 provided on the front and rear sides, respectively. That is, water is further filled in the pneumatic cylinder 161 installed at the front side to lower the front side for submergence, and the rear pneumatic cylinder 162 discharges water to adjust the amount of water sucked into the cylinder to incline in lower the front side. At the time of rising, the control is performed as opposed to submerge, and it is adjusted the inclination to control the fish head portion to upwardly move and the fish end portion to downwardly move.

On the other hand, in the preferred embodiment of FIG. 4, it is provided that the structure in which the inclination is controlled by providing two pneumatic cylinders 161 and 162 for correspondingly controlling each other, but it is not limited to thereto.

Figure 6:
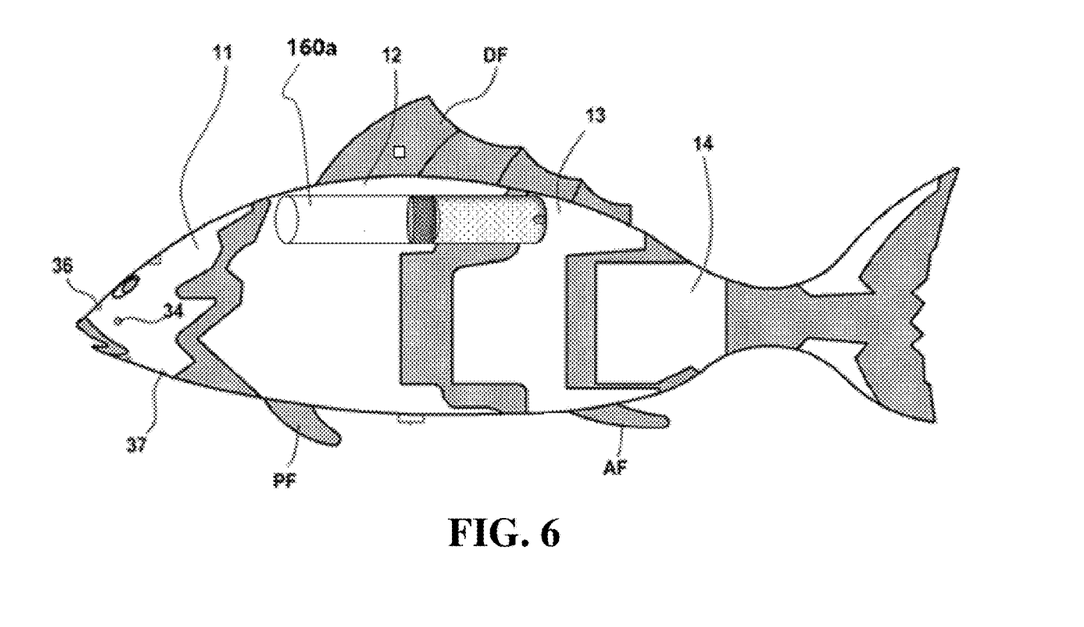
FIG. 6 is an explanatory view illustrating another embodiment of a buoyancy controller for a robotic fish according to the present invention.

FIG. 6 is an explanatory view illustrating another embodiment of the buoyancy regulator for the robotic fish according to the present invention.

As shown in FIG. 6, one pneumatic cylinder 160a is horizontally installed, the inclination may be adjusted by adjusting the suction amount of water filled in the cylinder. In the case where the inclination of the robotic fish is set to be in equilibrium when the piston is on the middle position of the cylinder, the inclination of the robotic fish can be adjusted by varying the amount of water filled in the cylinder by moving the piston in forward and backward directions.

As described above, the buoyancy control and inclination adjustment structure using the pneumatic cylinder may finely control the inclination, quickly adjust responsiveness, and adjusts the overall buoyancy together compared with a conventional structure in which the weight member is simply installed and the inclination is adjusted by moving the weight member.

However, it is difficult for the inclination adjusting means and the buoy adjusting means provided on the robotic fish to adjust the inclination at a large angle. That is, it is difficult to incline to 45 degrees or more abruptly in a horizontal state. Therefore, when submerging or upwardly swimming, the robotic fish can be slowly submerged or upwardly swum by generating the propulsive force while adjusting the inclination angle. As a result, even if the robotic fish can hit to the outer wall, the robotic fish is swum with the obstacle avoidance motion, the robotic fish may hit several times until the robotic fish submerges or upwardly swims to the desired depth, or the robotic fish may be caught in the corners of the aquarium, thereby causing damage or breakdown.

To remedy this problem in the present invention, as the swimming program of the control unit 110 of FIG. 3, it may be set up a program mode for diving and rising swimming to be controlled submerging or upwardly swimming with the spiral rotational swimming motion when submerging or upwardly swimming is controlled.

Figure 7:
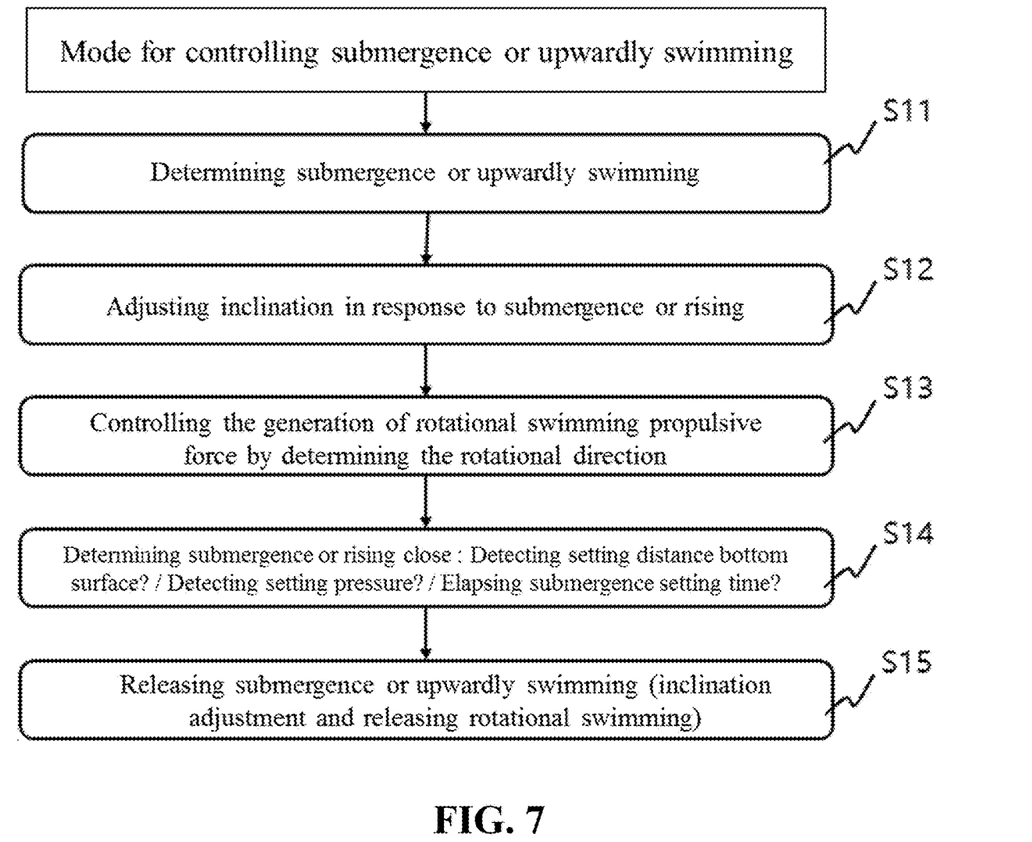
FIG. 7 is a flowchart of controlling submergence or upwardly swimming for a robotic fish according to the present invention.
Figure 8:
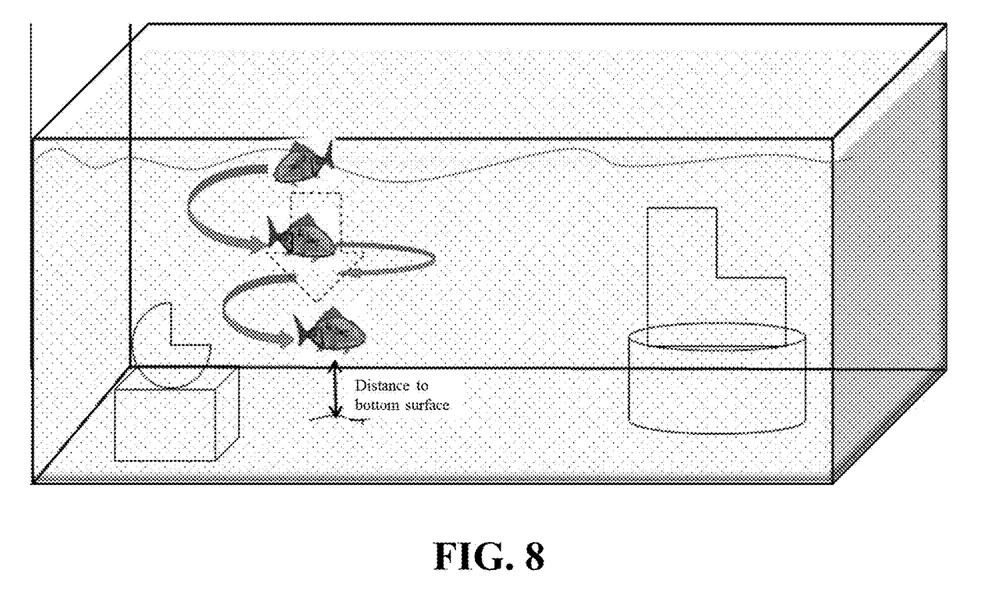
FIG. 8 is a diagram illustrating a spiral rotational submergence swimming of a robotic fish according to the present invention.

FIG. 7 is a flowchart of a swimming mode for controlling submergence or upwardly swimming for a robotic fish according to the present invention and FIG. 8 is a diagram illustrating a swimming mode for a spiral rotational submergence swimming of a robotic fish according to the present invention.

The submerging or upwardly swimming are set to automatically control the spiral rotational submerging or upwardly swimming in submerging or rising swimming time during the manual adjustments by the autonomous swimming or the wireless controller. Here, the diving swimming and the rising swimming only are controlled the inclination in opposite directions, and the submergence or the rising is controlled by the spiral rotational swimming.

The method of controlling submerging or upwardly swimming according to the present invention includes the steps of determining whether the submergence swimming or the upwardly swimming in the autonomous or the manual adjustment (S11), adjusting the inclination of the robotic fish to correspond to the submergence swimming or upwardly swimming in the case of submerging or upwardly swimming (S12), setting the rotational direction based on the sensing signal of the obstacle sensing sensors, and generating the rotational swimming propulsive force by controlling the joint portion in the rotation direction (S13), determining a submergence or rising closing point based on a predetermined condition while controlling the submergence or upwardly swimming to be performed by the spiral rotational swimming (S14), and releasing the spiral rotational swimming of the joint portion and closing the submergence and rising swimming when it is determined that of the submergence or rising closing point (S15).

FIG. 8 is a hypothetical spinning submergence swimmer view of the robotic fish according to the present invention. As shown in the figure, as submerging motion, the robotic fish is moved with the spiral rotational submergence, and the submergence may be closed by the distance from the bottom surface by adjusting the inclination and controlling by the rotational swimming. Therefore, in case that it can easily dive or rise swim to the desired depth even in the narrow space, thereby minimizing interference with surrounding walls or obstacles.

The control unit 110 determines whether is submerging swimming or upwardly swimming (S11). The determination of the submergence or upwardly swimming is to determine whether the submergence or rising time is set by the autonomous swimming program. Alternatively, when the user directly manipulates the robotic fish by using the wireless controller, it is determined whether the robotic fish is controlled by the submergence or a rising command. In manual control, when the submergence or rise command is simply received, the submergence and the rise is controlled by the spiral rotational swimming. Of course, the manual adjustment also allows the user to directly control the submergence or rise with the rotational swimming.

If it is determined that the submergence or rising swimming time is reached, the inclination is adjusted by the inclination corresponding to the submergence or the rise (S12). The inclination is adjusted using the weight device or the buoyancy regulator as shown in FIG. 4. As shown in FIG. 4, when the inclination is adjusted by using a pair of pneumatic cylinders on the front and rear side, the front and rear pneumatic cylinders are controlled to correspond to each other to adjust the inclination of the forward and backward in the submerging direction or the rising direction.

If the submergence or rising is suddenly required at this time, the inclination is adjusted to the maximum value. If it is not a rapid submergence or rise, the inclination ratio is controlled at a preset inclination ratio. In addition, the inclination control may be controlled at a desired inclination at a time, but the inclination range may be gradually adjusted in a certain time range.

The rotational swimming controls the generation of the propulsive force corresponding to the direction of rotation of at least one joint portion including a joint portion of the fish end side. By performing reciprocating movement only in left side region or right side region of the center line of the rotational movement of the left and right joints of the joint portion, thereby enabling the rotational swimming.

When performing the rotational swimming, the control unit 110 firstly determines whether there is an obstacle around the robotic fish through the obstacle sensing unit 120. The obstacle is sensed through the left sensor and the right sensor, and when the obstacle is sensed on either side, the direction of rotation is set in the opposite direction.

When the inclination is adjusted to the submergence direction (S12) and the rotational swinging propulsive force is generated (S13), the robotic fish submerges into the spiral rotational swimming as shown in FIG. 8.

While controlling the submergence or upwardly swimming with the spiral rotational swimming, it is determined that the submergence or rising end time (S14). The determination of the submergence or rising end time is controlled by the set conditions.

If it is necessary to submerge until the bottom surface, it is detected the distance to the bottom surface by installing a bottom surface sensor or using a bottom sensor. At this time, when the distance to the predetermined bottom surface is detected in consideration of the inertia of the robotic fish due to the submergence swimming, it is determined that of the submergence closing time.

As another method, it is detected that the hydraulic pressure by using the hydraulic pressure sensor, and determined that the submergence is closed when a preset hydraulic pressure is detected.

As another method, it is measured or calculated the time taken for the rotational submergence from the upper layer to the bottom surface and controlled the spinning submergence swimming for a predetermined set time from the submergence start position and, when the set time has elapsed, it is determined that of the submergence closing time.

On the contrary, since it is difficult to detect the distance of the bottom surface, it is possible to determine the rise closing time using the water pressure sensor or the set time without utilizing the bottom distance.

When performing the determination for the submergence and rising closing time as described above, it is possible to generate the straight propulsive form by adjusting the inclination in the horizontal direction or in the opposite direction and releasing the rotational swimming, or to generate the rotational swimming propulsive force in the opposite direction. This is determined by the set a swimming pattern.

In case of control by horizontal swimming after closing the submergence swimming, the inclination is adjusted to a horizontal state at the closing time of the submergence swimming, the rotational swimming is closed, and it is possible to generate horizontal propulsive force and to control it by horizontal swim. Of course, in consideration of the inertia force, the inclination and rotational directions are temporarily adjusted in opposite directions, and a method of returning to the horizontal state can be used.

As submerging and upwardly swimming control, the method of controlling the depth of submerging or the height of rise may adjust the depth of submergence and the height of rise using hydraulic pressure measurement. The maximum submergence depth and the maximum rising height are calculated from the position detected by the water pressure in a state where the submergence time from the highest rising position to the maximum depth, and the rise time from the maximum submergence position to the maximum height are measured and set. In addition, it can control the submergence or upwardly swimming during the set time by setting the submergence or rise time.

Generally, there is a problem that when the robotic fish is operated in the aquarium, the robotic fish does not swim at a height desired by visitors or an operator, and most of the swimming is performed on the bottom or surface of water.

In the present invention, it is allowable for smooth submergence and rising swimming within the narrow space by controlling the submergence and upwardly swimming by the helical spinning manner as described above, if it is used the helical spinning manner, the robotic fish may swim in the appropriate depth. That is, when setting an autonomous swimming program, it may be set to maintain an appropriate depth of water, or swim with submerging and rising swimming repeatedly.

Figure 9:
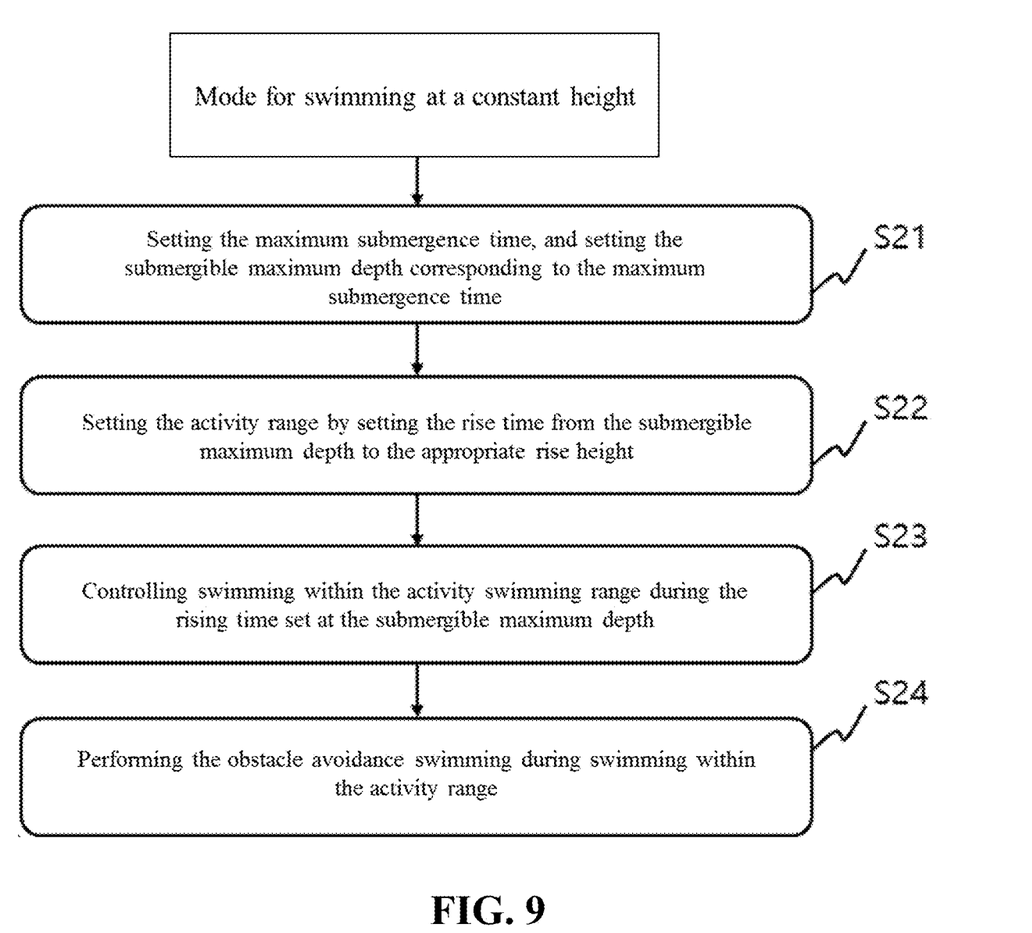
FIG. 9 is a flowchart of controlling a set water depth of a robotic fish according to the present invention.

FIG. 9 is a flowchart of controlling a set water depth of the robotic fish according to the present invention.

The operation method of a swimming mode for controlling swimming at constant height includes the steps of setting a maximum submergence time and setting a depth to be submerged during a maximum submergence time as a submersible maximum depth (S21), setting a rising time at the maximum submergence depth and setting activity swimming range as the height to be risen (S22), and controlling the swimming within the activity swimming range from the maximum depth to the rising height (S23). In addition, if the outer wall is sensed in the activity swimming range step S23, the obstacle avoiding operation may be performed by the rotational swimming.

According to the present invention, the step S21 of setting the submersible maximum depth may be performed by measuring the depth of water by the user, or may be set the maximum submergence time and set the submerged depth during the maximum submergence time to the maximum submergence depth.

According to the present invention, it is possible to smoothly perform the submergence and upwardly swimming even in the narrow space by controlling the submergence and upwardly swimming by the spiral swimming manner as the submergence method. Therefore, rather than simply measuring the depth from the surface to the bottom and using it, and actually, the time taken by submerging is measured until the time when the bottom surface is sensed by the rotational submergence swimming, and the maximum submergence time is set by using the submergence time to the bottom surface.

That is, the maximum submergence time is set to the ratio of time (for example, the maximum submergence time=90% of the submergence time to the bottom surface) relative to the submergence swimming time from the topmost layer to the bottom surface. Therefore, it is possible to automatically control the submergence swimming in the upper layer using the robotic fish, it is measured the time taken to reach the depth at which the bottom surface is detected by a bottom surface sensor. The time of the appropriate ratio of the time taken to reach the bottom surface measured can be set as the maximum submergence time.

At this time, it is desirable to set a depth to prevent collision with the floor surface. In consideration of the depth of the aquarium or the viewing angle of the viewer, the user appropriately sets the maximum submergence time in consideration of the submergence time to the bottom surface.

The maximum submersible depth is set by submerging with the rotational swimming during the maximum submergence time set as described above. The maximum submersible depth should be set, since if the maximum submergence time is simply set, the robotic fish can hit the bottom surface during submerging. The maximum submersible depth is set the submersible depth by hydraulic pressure measurement using the hydraulic pressure sensor 140.

When the maximum submersible depth is set as described above, the rising time is set from the maximum submersible depth. This indicates that the rising time is set at a predetermined ratio of the set time in proportion to the maximum submersible time. Of course, the maximum rise height can also be set with water pressure for the rise height. However, there is no problem in upwardly swimming when the robotic fish is upwardly swum to water surface, if the rising time is set, the rising height adjustment is naturally achieved because the rising height is changed depending on the rotational swimming position or the obstacle detection.

Therefore, the activity swimming range is set to the maximum submersible depth and the interval at which the robotic fish is raised during the set rising time at the maximum submersible depth. That is, the submergence depth is the depth corresponding to the water pressure measured by the water pressure sensor, and the rising range is set as the rising time.

In the present invention, the user can set the activity swimming range to the aquarium depth using the appropriate ratio. For example, the range of activity can be set to a ratio of depth to depth, with 80% of the depth from the surface to the maximum submersible depth, and 10% of the depth from the surface to the maximum rising height.

In this way, the depth of water is automatically measured by the submergence swimming, the maximum submersible depth in the activity swimming range is set, and the rising time is set with the rising time at which the robotic fish upwardly swims at the maximum submersible depth and reaches to the predetermined height.

When the activity swimming range is set as described above, the robotic fish detects the water pressure by the hydraulic pressure sensor and submerges to the submersible maximum depth. When the robotic fish is reached to the submersible maximum depth, the robotic fish is upwardly swum during the set rising time. The robotic fish submerges to the maximum submersible depth and upwardly swims during the set time repeatedly to control the swimming within the activity range (S23).

It is possible to prevent an obstacle catching state such as being driven into a corner or continuously hit in one direction during submerging and upwardly swimming by performing the obstacle avoiding operation in the submerging and the upwardly swim.

On the other hand, when the robotic fish is swimming, it sometimes gets caught in the corners of the aquarium or gets caught by the obstacle and then may not escape from the obstacle. This is because there is no backward function. As the present invention, the robotic fish that gains the propulsive force by swinging the joint portion in the left and right directions is usually difficult to impart the backward function. In order to provide the backward function, it is necessary to install a backward propulsive device, but it is also difficult to increase the number of parts and complicate the structure of control device.

In order to solve the above-mentioned problems, in the present invention, it is provided an obstacle escape swimming control method capable of escaping from a state of being caught by the autonomous swimming operation by adjusting the inclination, when the robotic fish that gains the propulsive force by swinging the joint portion in the right and left directions is caught between the left and right obstacles.

Figure 10:
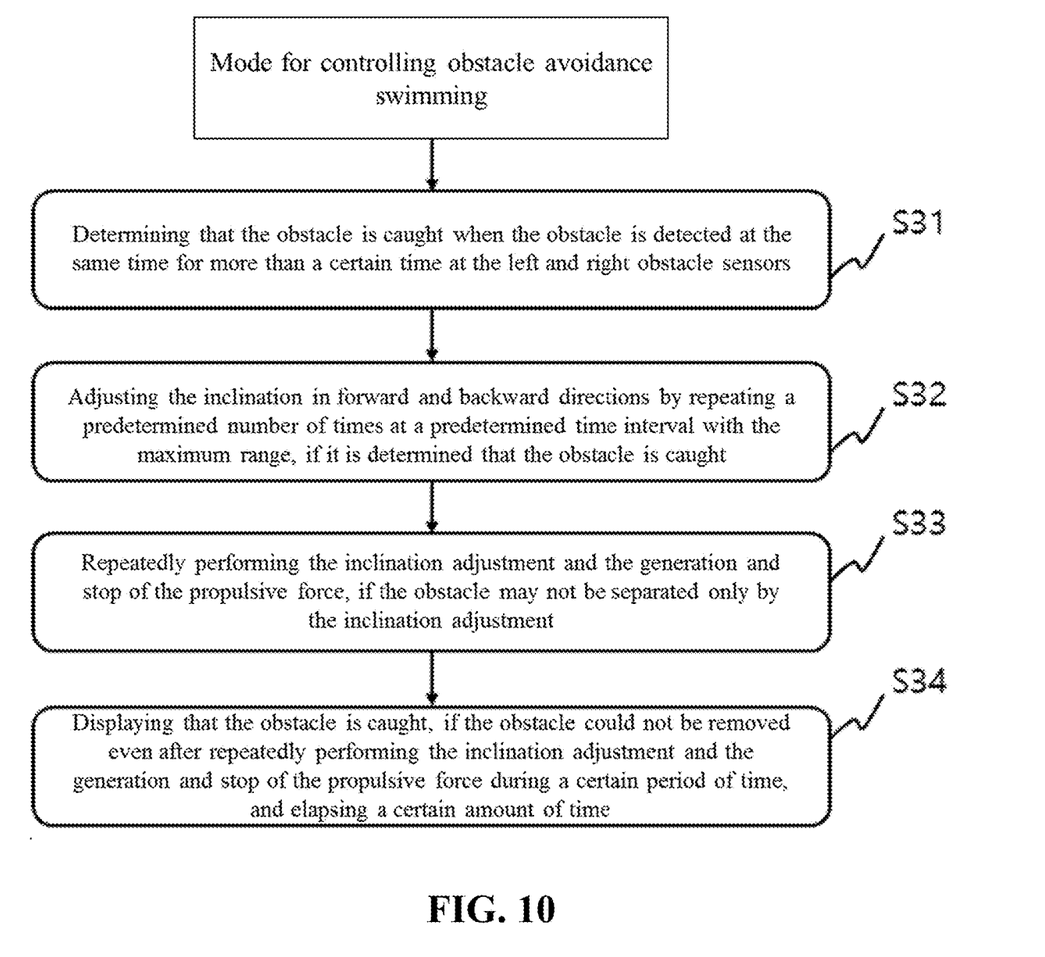
FIG. 10 is a flow chart of controlling obstacle avoidance swimming of a robotic fish according to the present invention.

FIG. 10 is a flow chart of controlling obstacle avoidance swimming of the robotic fish according to the present invention.

As shown in FIG. 10, the operation method of swimming mode for controlling obstacle avoidance swimming of the robotic fish performs the steps of an obstacle catch determining step S31 of determining that the obstacle is caught when the left and right sensors of the robotic fish continuously detect the obstacle for a predetermined time or more; an inclination adjusting step S32 of repeatedly adjusting the inclination by a predetermined number of times at a predetermined time interval by using the buoyancy regulator when it is determined that the obstacle is caught; an propulsive force generation repetition step S33 of determining the obstacle catching state while performing the inclination adjusting step S32, generating the propulsive force with the inclination control and stopping the propulsive force for a predetermined time when the obstacle is continuously caught; and an obstacle catching state display step S34 of determining the obstacle catching state while performing the propulsive force generation repetition step S33, generating the propulsive force with the inclination control and stopping the propulsive force for a predetermined time when the obstacle is continuously caught, and displaying obstacle catching state when the robotic fish is not escaped from the obstacle for a predetermined time or longer.

When the robotic fish is operated in the aquarium, the obstacle avoidance operation controls the swimming using a front sensor, a left and right sensor, a bottom sensor, and the like. However, in some cases, the robotic fish is caught in the corner, and forward, left and right rotations, and the submergence and upwardly swimming are impossible. That is, the obstacle catching state is occurred. When the obstacle is caught, since there is no backward propulsive force, then the robotic fish may not be easily escaped.

In the preferred embodiment of the present invention, it is determined that the obstacle is caught, when the left and right sensors continuously detect the obstacle for a predetermined time or more (S31).

The obstacle detection sensors of the present invention include a left sensor 34, a right sensor (not shown), a front sensor 36, and a bottom sensor 37. The above-mentioned obstacle detection sensors detect that the robotic fish is approaching within a predetermined distance from the obstacle to control the obstacle avoidance swimming. Generally, the obstacle avoidance swimming performs the obstacle avoidance swimming motion by generating the propulsive force in the direction of the opposition when the obstacle is detected.

However, when the obstacle is detected on both sides of the corners, the obstacle avoidance operation is not performed. Accordingly, in the present invention, if the obstacle is continuously detected for a predetermined time or longer in the left and right sensors, it is determined that the obstacle is caught. It means that the obstacle detection signal is continuously detected within a predetermined time rather than the obstacle detection signal is continuously detected.

If it is determined that the obstacle is caught, the propulsive force is stopped while releasing the currently controlled pattern swimming. In a state in which the propulsive force is stopped, the inclination is controlled to be inclined forward to the maximum and inclined backward to the maximum using the inclination adjusting means (S32).

The inclination adjusting step S32 repeats the inclination adjusting operation by forwardly inclining the robotic fish and backwardly inclining for the robotic fish again in the absence of the propulsive force. At this time, the inclination adjusting may be repeatedly performed forwardly and backwardly in succession. Or a predetermined time has elapsed after temporarily stopping at the time of inclination with the maximum inclination; it is also possible to adjust the inclination in the opposite direction. Alternatively, the inclination is adjusted to the forward direction with the maximum inclination and returned to the horizontal state in succession, maintained the horizontal state for a predetermined time, and backwardly inclined with the maximum inclination again, returned to the horizontal state in succession, and then maintained the horizontal state for a predetermined time by the continuous operation.

Since the inclination of the robotic fish swims and the pulsation may be occurred by adjusting the inclination as described above, typically the robotic fish can flow backwards or sideways along the water flows. This will allow the robotic fish to escape from the obstacles.

However, in case that it is impossible to escape from the obstacle by merely adjusting the inclination, the propulsive force is intermittently generated with the inclination adjustment, and the water flow is forcibly generated, so that the robotic fish escapes from the obstacle by taking the flow of water reflected from the obstacle. That is, it may further include the propulsive force generation step S33 for generating and temporarily stopping the propulsive force with the inclination adjustment.

This is because the propulsive force causes the robotic fish to hit the obstacle and gain the reaction force to escape from the obstacle.

Of course, the propulsive force generated at this time controls by the joint motor at low speed to prevent the robotic fish from being destroyed or damaged by hitting with the outer wall. Because it is the low propulsive force, it lightly touches the outer wall, and it can be backwardly pushed by the reaction force by the reaction force stop.

In addition, when the propulsive force is generated, it is possible to measure the obstacle detection signal of the left and right sensors to generate rotational propulsive force that is rotated in either direction. This allows the obstacle sensing sensor to generate rotational propulsive force far away from the obstacle sensing distance. Or vice versa, it is generated the rotational propulsive force in the direction of the adjacent obstacle, forced the robotic fish to hit the obstacle, stopped the propulsive force, and allowed the obstruction to flow backward by the reaction force.

As described above, if the inclination adjusting step S32 and the propulsive force generating step S33 are repeatedly performed and the obstacle catching state is maintained for a predetermined time or longer, the obstacle catching state is displayed until it is naturally escaped along the flow of water. In this case, if the obstacle escape is successively performed by continuously performing the step S31 of determining the obstacle catching unit by the obstacle detection, the autonomous swimming is controlled by the set autonomous swimming pattern.

Each of the determination and control steps according to the embodiment of the present invention can be performed by the control unit 110 or the controlling device.

On the other hand, in the present invention, the buoyancy regulator is provided as the inclination adjusting means. Therefore, by controlling the buoyancy regulator, the total buoyancy of the robotic fish can be varied. That is, the total buoyancy can be adjusted by adjusting the amount of water filled in the pneumatic cylinders on the left and right sides. It is also possible to vary the total buoyancy of the robotic fish when attempting to escape the obstacle.

The method may further include, repeatedly switching and controlling the buoyancy of the buoyancy regulator with the maximum buoyancy and the minimum buoyancy independent of the inclination adjustment or the inclination adjustment when attempting to escape from the obstacle catching state. As a result, not only the inclination variability but also the total buoyancy is variable.

As described above, the robotic fish according to the embodiment of the present invention is the robotic fish that splits the body portion into a plurality of blocks and generates the propulsive force for swimming in the left and right rotational swimming using the joint portions. As the inclination adjusting means of the robotic fish, a weighting device may be used. The buoyancy regulator for adjusting buoyancy and inclination by adjusting the suction and the discharge amount of water by using the pneumatic cylinder.

In the present invention, the inclination is controlled so that a smooth submergence or upwardly swimming is possible in the aquarium such as the aquarium where the swimming space is narrow, and the submergence or upwardly swimming can be controlled by the spinning rotational swimming.

In addition, a water pressure sensor is installed for water depth measurement, and the maximum depth and the rise time for submerging are set so as to swim within a certain range of depth of water, thereby preventing swimming on only the surface or the bottom surface. Also, the present invention provides the swimming method for repeating the inclination adjustment or alternatively inclining and the propulsive force generation and interruption when the robotic fish is caught between the edges or obstacles so that the robotic fish can escape naturally from the obstacle without the backward propulsive means.

What is claimed is:

1. An apparatus for controlling swimming of a robotic fish configured to operate in a space of an aquarium, the apparatus comprising:
   a fish shaped body portion divided into a plurality of pieces including at least one joint portion, wherein the at least one joint portion connects the fish shaped body portion to be rotatable in left and right directions and comprises a pivotal hinge or a servomotor;
   a controlling device generating a straight or rotational propulsive force and controlling swimming of the robotic fish to avoid obstacles in the space detected by an obstacle detection sensor by controlling the at least one joint portion;
   an inclination adjusting controller adjusting an inclination of the robotic fish in forward and backward directions; and
   an inclination sensor detecting the inclination of the robotic fish in the forward and backward directions,
   wherein the controlling device controls the robotic fish to be submerged or raised by helical rotational swimming in an activity swimming range within the space by adjusting the inclination of the robotic fish in the forward direction and by generating the rotational propulsive force by controlling the at least one joint portion,
   wherein a submersible maximum depth and a rising time corresponding to the activity swimming range are preset, and
   wherein the controlling device controls the robotic fish to be submerged or raised within the activity swimming range repeatedly by alternatively controlling submerging by the helical rotational swimming to the submersible maximum depth and upward swimming by the helical rotational swimming during the rising time.

2. The apparatus of claim 1, further comprising a water pressure sensor,
   wherein the controlling device measures a water depth based on a water pressure sensed by the water pressure sensor, and controls the submergence or the upward swimming within the activity swimming range.

3. The apparatus of claim 1, wherein the inclination adjusting controller comprises a pair of pneumatic cylinders,
   wherein each of the pair of pneumatic cylinders is installed on a front and back sides of the robotic fish, respectively, and the pneumatic cylinders are configured to vary a buoyancy and a weight of the robotic fish by sucking water into one side of the cylinder or by discharging the water within the cylinder by controlling a forward or backward movement of a piston, and
   wherein the buoyancy and the inclination of the robotic fish are adjusted by equally or differently varying an amount of water sucked into the pair of pneumatic cylinders.

4. The apparatus of claim 1, wherein the inclination adjusting controller comprises a pneumatic cylinder configured to vary a buoyancy and a weight of the robotic fish by sucking water into one side of the pneumatic cylinder or by discharging the water within the pneumatic cylinder by controlling a forward or backward movement of a piston,
   wherein the buoyancy and the inclination of the robotic fish are adjusted by varying an amount of water sucked into the pneumatic cylinder, and
   wherein the pneumatic cylinder is installed horizontally from a front to back direction of the robotic fish.

5. A method of controlling swimming for a robotic fish configured to operate in a space of an aquarium, the method comprising:
   generating, by a controlling device installed in a body portion of the robotic fish, a straight or rotational propulsive force by controlling at least one joint portion of the body portion; and
   controlling, by the controlling device, swimming of the robotic fish to avoid obstacles detected by an obstacle detection sensor by controlling the at least one joint portion,
   wherein the at least one joint portion comprises a pivotal hinge or a servomotor,
   wherein the controlling device controls the robotic fish to be submerged or raised by helical rotational swimming in an activity swimming range within the space by adjusting an inclination of the robotic fish in a forward direction and by generating the rotational propulsive force by controlling the at least one joint portion,
   wherein a submersible maximum depth and a rising time which are corresponding to the activity swimming range are preset, and
   wherein the controlling device controls the robotic fish to be submerged or raised within the activity swimming range repeatedly by alternatively controlling submerging by the helical rotational swimming to the submersible maximum depth and upward swimming by the helical rotational swimming during the rising time.

6. The method of claim 5, the controlling the swimming of the robotic fish comprises:
   determining whether the submerging or the upward swimming starts;
   setting a rotational direction based on a sensed signal of the obstacle detection sensor, and generating the rotational propulsive force by controlling the at least one joint portion in the rotational direction;

determining a stopping point of the submerging or the upward swimming based on a predetermined condition while controlling the submerging or the upward swimming; and releasing the helical rotational swimming of the at least joint portion and stopping the submerging or the upward swimming when a position of the robotic fish is determined to be at the stopping point.

7. The method of claim 5, wherein the obstacle detection sensor comprises a left side obstacle sensor and a right side obstacle sensor disposed on left and right sides of the robotic fish, respectively, and wherein the method further comprises:

when an obstacle is detected by the left side obstacle sensor or the right side obstacle sensor, repeatedly adjusting the inclination of the robotic fish to be inclined in forward and backward directions at predetermined time intervals while the generation of the propulsive force and driving of the at least one joint portion is stopped until the left and right obstacle sensors stop detecting the obstacle.

* * * * *